(12) United States Patent
Siegel et al.

(10) Patent No.: US 9,106,742 B2
(45) Date of Patent: Aug. 11, 2015

(54) DEVICES, SYSTEMS, AND/OR METHODS REGARDING TELECOMMUNICATIONS ADDRESSING

(75) Inventors: Steven A. Siegel, Mendham, NJ (US);
Siroos Afshar, Englishtown, NJ (US);
Henry Kafka, Sandy Springs, GA (US);
Leopold Strahs, Williamsburg, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1894 days.

(21) Appl. No.: 11/943,935

(22) Filed: Nov. 21, 2007

(65) Prior Publication Data

US 2009/0129561 A1    May 21, 2009

(51) Int. Cl.
*H04M 11/04*    (2006.01)
*H04M 3/428*    (2006.01)
*H04L 29/06*    (2006.01)

(52) U.S. Cl.
CPC ............. *H04M 3/4288* (2013.01); *H04L 65/40* (2013.01); *H04L 65/1006* (2013.01); *H04L 65/1069* (2013.01); *H04M 2242/04* (2013.01)

(58) Field of Classification Search
USPC ............ 379/37–51, 93.01, 404.1, 33, 208.01, 379/221.14
See application file for complete search history.

(56) References Cited

U.S. PATENT DOCUMENTS

| 2002/0184346 A1* | 12/2002 | Mani | 709/220 |
| 2007/0032219 A1 | 2/2007 | Rudolf | |
| 2008/0123821 A1* | 5/2008 | Goldman et al. | 379/45 |
| 2008/0310599 A1* | 12/2008 | Purnadi et al. | 379/37 |

* cited by examiner

*Primary Examiner* — Yosef K Laekemariam
(74) *Attorney, Agent, or Firm* — Akerman LLP; Michael K. Dixon; Roy P. Zachariah

(57) ABSTRACT

Certain exemplary embodiments comprise a method, which can comprise automatically causing a call to be connected. The call can be connected via a Session Initiation Protocol (SIP) user identity provided by a calling device that requests the call. The SIP public user identity can be associated with one or more called devices. The SIP public user identity can be one of a set of one or more SIP user identities associated with a user.

21 Claims, 3 Drawing Sheets

DEVICES, SYSTEMS, AND/OR METHODS REGARDING TELECOMMUNICATIONS ADDRESSING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
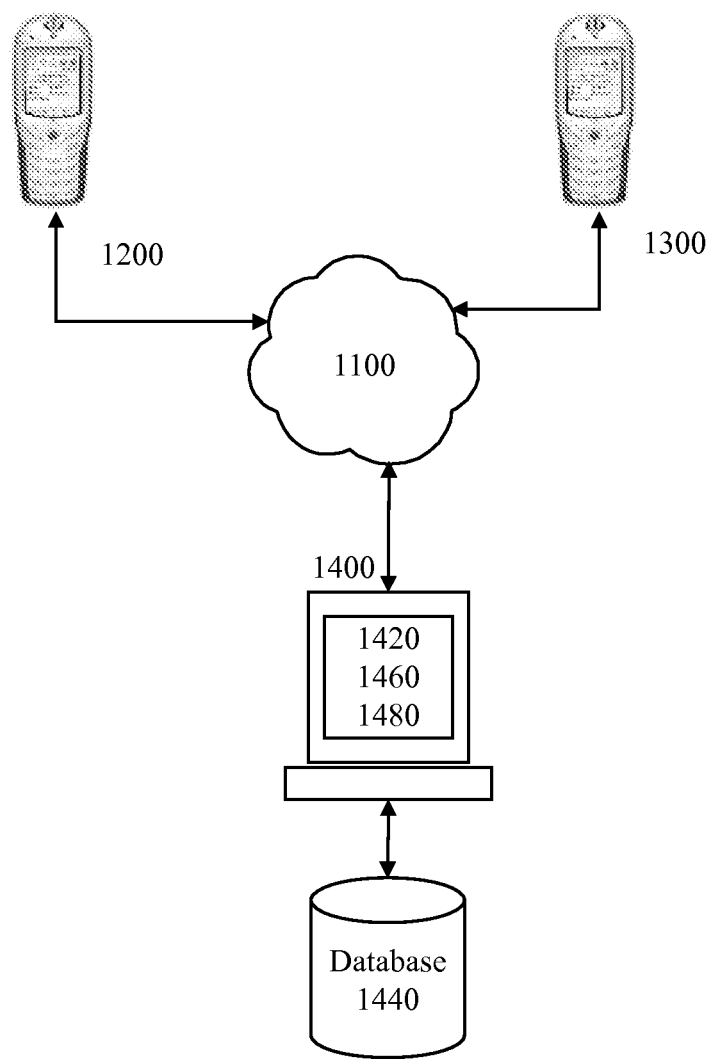
FIG. 1 is a block diagram of an exemplary embodiment of a system 1000.

Certain exemplary embodiments provide a method, which can comprise automatically causing a call to be connected. The call can be connected via a Session Initiation Protocol (SIP) public user identity (PUID) provided by a calling device that requests the call. The SIP public user identity can be associated on a temporary basis with one or more called devices. The SIP public user identity can be one of a set of one or more SIP user identities associated with a user.

In certain exemplary embodiments, one or more SIP public user identities can be assigned to a user in an Internet Protocol Multimedia Subsystem (IMS) network. One or more of the SIP public user identities can be adapted to provide special priority access to the user. Variations of this new capability can be controlled by user options and/or offered as alternative services.

A special SIP Public User Identity can be chosen by and/or provided to the user or can be constructed in a manner such as by appending "911" to a handle of an SIP Public User Identity. The special SIP PUID can be recognized for special treatment by devices in the network and/or the called device. In form, the special SIP PUID can be like any other SIP PUID. For any calls, including calls coming from a phone without SIP addressing, a separate telephone number can be utilized. Such a telephone number can be converted into a special SIP Public User Identity. Control over utilization of the special SIP Public User Identity can be done with either controlled distribution of the special PUID, white lists allowing only certain users to get priority access, or Personal Identification Numbers (PINs) confirming that the caller may use the special access when used.

Priority access can be defined by the user from choices given or can be provided in a predetermined manner. Some possible elements of priority access can comprise:

priority break in into an existing session, which can be on network hold and/or otherwise;

providing an originator with choice of whether to break in to existing session;

simultaneous alerts to all and/or a defined subset of Public User Identities (PUIDs) associated with the user that are currently registered;

interaction with emergency alerting available on the device (e.g., special tones and/or message waiting indications, etc.);

use of messaging to alert all and/or a defined subset of PUIDs (or a defined set of messages to non-SIP endpoints) regarding an emergency via a predetermined and/or custom message selected and/or entered by an originating party;

break into other services (e.g. Internet Protocol television (IPTV) and/or gaming, etc.) to deliver an emergency message and/or alert; and/or certain exemplary embodiments can be used for various types of "emergencies" by families, businesses, public officials, military organizations, clubs, and/or civic groups, etc.

Emergencies can arise and users can trust certain people to judge that an emergency contact is desirable. Such people can include wives, children, parents, secretaries, and/or bosses, etc. Certain exemplary embodiments can allow the user control of what emergency contact procedures might be used and who can use them.

In certain exemplary embodiments, an IMS network can be adapted to provide routing and/or services via a Public User Identity. Certain exemplary embodiments can associate a user service with a specific PUID. Certain exemplary embodiments can provide emergency access service across multiple PUIDs and/or multiple communications services.

Certain exemplary embodiments can be adapted to contact the user in one or more special manners during what might be defined as emergencies. In certain exemplary embodiments, a calling party might not know all identities of the user. The user can be alerted in the manner chosen by the user. If white lists are used, the user can change who is granted calling privileges by changing who is on the white list, for example, as roles change and/or if abuse is experienced.

Certain exemplary embodiments can associate a plurality of Public User Identities with a telecommunications user, thereby multiple personas. A separate persona can be used for emergency calls only. Separate services can be defined for one or more personas via one or more service profiles. Each persona can have a different registration state in a SIP registrar (i.e. whether they are registered at any address and which addresses at which they are registered to receive sessions) as compared to registration states of other personas. A user device can be adapted to distinguish between calls to different personas (PUIDs) and/or provide different device-based services (such as alerting) based on each different persona (PUID).

In certain exemplary embodiments, a service class can be based on a persona (PUID). The persona can be used for the service rather than just a separate identity that has one or more defined services. In certain situations, the user might desire to be in a "do not disturb" state. For example, the user might unplug or turn off a ringer of the bedroom phone when trying to sleep. Cell phones can be turned off and/or put into silent mode during meetings, in churches, at events, in theaters, and/or in music halls, etc. Certain exemplary embodiments can be adapted to provide services when a "do not disturb" state can be described as a "do not disturb except in case of emergency" state, which might not completely turn off the device or its alerting mechanism, but might make the respond only when the emergency PUID were used.

Certain exemplary embodiments can distinguish between emergency calls and calls that can be postponed, such as a personal call at an office. The user can be involved in such activities as an in-person meeting and/or telecommunication, etc. An incoming call can be identified as being from a relative or close friend. If a delay in the communication is acceptable, a desired and/or polite procedure can be to allow the call to go to voicemail and returned at a later time. However, certain personal calls can be emergencies and the user might desire to provide immediate attention. Certain business calls can also be relatively urgent. Certain exemplary embodiments can distinguish between a call that can wait and an emergency call. Certain exemplary embodiments can distinguish the emergency call from other calls.

Certain exemplary embodiments can utilize two means by which a high priority call can be distinguished from a normal call. Both means can involve a determination of to which persona and/or PUID the call is sent. One means can involve giving a special high priority telephone number or SIP PUIDs to trusted contacts that the user desires to grant permission to place high priority calls. Some possible candidates can be family members, personal secretaries, supervisors, direct subordinates, and/or highly valued contacts, etc. Certain exemplary embodiments can utilize two categories of contacts with regard to the ability to use priority addressing. Some contacts might be given only the priority telephone number and/or SIP address because such calls should receive high priority treatment. An example of this might be the contact number that a head of the Joint Chiefs of Staff might give to the President of the United States. Others might be given two numbers, one for normal calls and another for emergencies. Examples of the use of this approach can be numbers given to family members or a personal secretary.

Another means of accomplishing the ability to distinguish high priority calls is via a programmed network device capable of changing the PUID in a SIP message header based on rules set forth in machine instructions. Changing to the high priority PUID (emergency PUID) can result in the delivery of the services associated with that special PUID). For example, calls from the office of the President of the United States and/or calls from Asia can have an associated request URI changed to the high priority PUID by such a device. If a user desires certain calls to have a high priority, the user can define filter criteria for such calls that can be used to determine whether to use the high priority PUID. Certain exemplary embodiments can provide a relatively simple user interface that simplifies the task for the user and secures the service.

Certain exemplary embodiments can utilize a combination of two approaches. Some calls can be given high priority by the PUID used by the caller. Others can be given high priority by rules executed by a network device. A network device capable of changing the PUID in a message header can be used to prevent calls from users who know the high priority number, but should no longer be using it to get high priority treatment. The network device can execute programmed instructions to check if the caller using the high priority PUID is permitted to use the high priority PUID. For example, if a PUID of the caller is not on a white list and/or if the PUID of the caller is specified on a black list, such a device can be adapted to refuse to change the PUID to the high priority PUID and/or change the PUID in the request URI to a regular PUID. For example, if an ex-spouse or an unknown caller attempts to assert the high priority PUID as the Request URI, the device can be adapted to prevent access to the user.

Once high priority calls have been identified, exact treatment of such calls can be customer specified. Because each high priority call can comprise a special PUID associated with the called party, each call can invoke a unique service profile and/or different services. Certain exemplary embodiments can comprise special services designed for the treatment of high priority calls. For example, if calls are anchored under the control of an application server, a service can be adapted to automatically break into the existing call and/or communicatively couple a call that comprises the high priority address. The existing call can be placed on a network-based hold and/or played an announcement. Certain exemplary embodiments can provide the caller with an option regarding whether to break in to an existing session and/or use one or more means of alerting to inform a called user of an emergency.

As a separate PUID, the high priority PUID can have a different registration state from other PUIDs. Certain exemplary embodiments can allow other PUIDs to have calls sent to them sent to voicemail, while calls to the high priority PUID can be sent to one or more called devices. Certain exemplary embodiments can "turn off" a telecommunications device except for high priority calls at night, during meetings, when the user is at a theater, and/or when the user is at a social function, etc. A different PUID as the Request URI can allow device-based services in support of high priority access. For example, certain exemplary embodiments can utilize a distinctive ring and/or turning ringing off for all calls except high priority calls.

Certain exemplary embodiments can distinguish calls and/or inform the user of the different PUID, which can allow more informed call-based actions. In certain exemplary embodiments, the device might not treat the incoming high priority call in any special manner. For certain calls the device can display the Request URI (the emergency PUID) used along with caller information. Such embodiments can allow the user to be aware of whether the caller has designated the call a high priority call. The user can make an informed decision on whether to interrupt current activity to answer the call, to allow the call to go to voicemail, and/or to return the call later, etc.

The PUID can be associated with a user rather than a device. The IMS network and/or a SIP Registrar function of a terminating Serving-Call Session Control Function (S-CSCF) can convert the PUID into a routable network address, which can determine the device. If the user is registered at more than one network address, certain exemplary embodiments can fork a communication to multiple devices. Forking can involve making copies of the message and sending the copies of the message to different locations. In certain exemplary embodiments:

the user can have one or more PUIDs;
each PUID can represent one user;
each PUID can be converted into one or more network addresses by one or more devices in the IMS network; and/or
the network addresses can designate associated equipment, etc.

FIG. 1 is a block diagram of an exemplary embodiment of a system 1000, which can comprise a network 1100, which can be a telecommunications network. Network 1100 can be adapted to communicatively couple a first telecommunications device 1200 and/or a second telecommunications device 1300. Activities associated with network 1100 can be monitored and/or controlled by server 1400. Server 1400 can be a single device or can have capabilities distributed over two or more devices that work together. Server 1400 can comprise a user interface 1420, which can be adapted to render information regarding communicative couplings between telecommunications devices and/or information regarding PUID addresses associated with network 1100. Server 1400 can comprise a user program 1460, which can be adapted to manage, monitor, and/or control communicative couplings related to network 1100.

In certain exemplary embodiments, server 1400 can be adapted to receive a transmitted request that comprises an emergency Session Initiation Protocol (SIP) public user identity. Server 1400 can be adapted to cause an automatic prompt to be provided to a user of a one or more called devices. The automatic prompt can be adapted to empower the user of the one or more called devices to interrupt a previously coupled call to receive an emergency communication. The emergency Session Initiation Protocol (SIP) public user identity can be uniquely associated with the one or more called devices. The emergency SIP public user identity one of a set of one or more SIP public user identities associated with the user of the one or more called devices. The emergency SIP public user identity can be defined in an Internet Protocol Multimedia Subsystem network.

Figure 2:
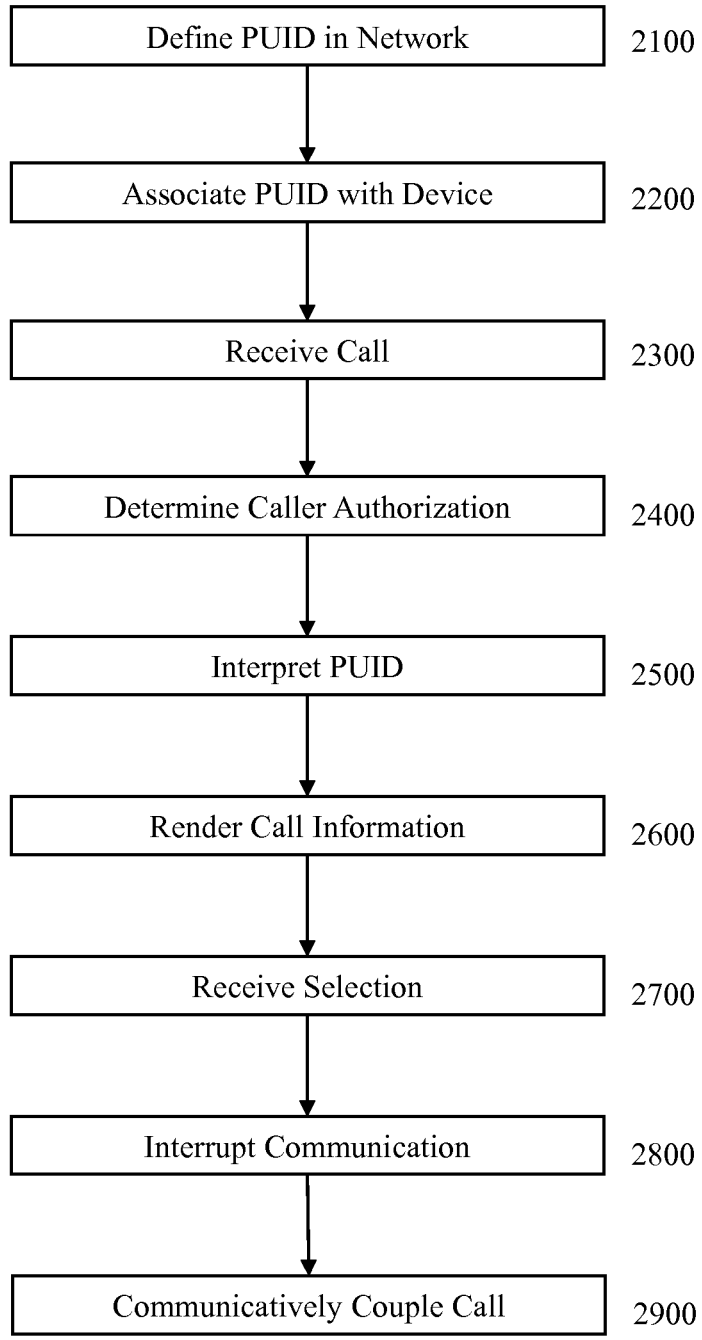
FIG. 2 is a flowchart of an exemplary embodiment of a method 2000.

FIG. 2 is a flowchart of an exemplary embodiment of a method 2000. Any activity of method 2000 can be performed substantially manually and/or substantially automatically. In certain exemplary embodiments, any set and/or subset of activities of method 2000 can be performed via machine instructions stored on a machine-readable medium, which can be executable via an information device. In certain exemplary embodiments, one or more activities of method 2000 can be performed responsive to a signal that comprises machine instructions adapted to cause an execution of the one or more activities by an information device.

At activity 2100, a PUID can be defined in a network, such as in a database coupled to the network. The PUID can be uniquely associated with a telecommunications user. The PUID can be an emergency Session Initiation Protocol (SIP) public user identity. The PUID can be associated with a set of services provided by the network. The server can comprise one or more predetermined instructions regarding the PUID and/or how to respond to a request for a call to the PUID.

At activity 2200, the PUID can be associated with one or more devices on the network. For example, a memory device associated with a server on a network can store information regarding PUIDs. Each PUID can be associated with one or more telecommunications devices by a user and/or a system administrator. The association of the PUID with the device(s) is done through a process called registration by the 3GPP. The server can comprise one or more predetermined instructions regarding the PUID and/or how to respond to a request for a call to the PUID.

At activity 2300, a request for a call can be received from a calling party by a network server (the S-CSCF). The request for the call can comprise and/or provide the PUID of the called party. The PUID can be associated by a network server with a set of instructions to be processed (called a Service Profile). The PUID can be associated by a network server with one or more called devices. The PUID can be one of a set of one or more PUIDs associated with a user of the called devices. The PUID can be defined in an Internet Protocol Multimedia Subsystem network. The request of the calling device can comprise the PUID, which can be adapted to cause an alert to be rendered via the one or more called devices. The alert can prompt the user of the one or more called devices that the call is an emergency communication. The alert can be adapted to empower the user of the one or more called devices to interrupt a previously coupled call to receive the call.

At activity 2400, a determination, such as an automatic determination can be made regarding whether or not the calling party is authorized by the user to utilize the PUID. In certain exemplary embodiments, a predetermined list of authorized users can be stored in a memory device. An identification of an identity of the calling device and/or a calling party associated with the calling device, such as a PUID representing the calling party which could be derived from Caller ID value, can be automatically compared to the predetermined list of authorized users. If the calling device and/or calling party are not comprised in the predetermined list of authorized users, certain exemplary embodiments can be adapted to terminate the call and/or forward the call to a messaging system. The set of instructions identified in activity 2300 can indicate that such an automatic determination might take place.

At activity 2500, the PUID can be modified. For example, the PUID has been identified as being associated with an emergency communication in activity 2300. The server can be adapted to change the PUID to a changed PUID responsive to a determination that predetermined instructions regarding an original SIP public user identity are applicable. For example, if the calling device is not authorized to utilize the PUID, the server can be adapted to change the PUID to a changed PUID that has a different set of instructions associated with it that result in a lower calling priority that is not associated with an emergency and might be routed to a voicemail system.

At activity 2600, call information can be rendered to the calling party and/or the user. Certain exemplary embodiments can be adapted to automatically alert, provide, and/or render:
  that the call is the emergency communication;
  that the call is the emergency communication when other alerting functions of the one or more called devices are not alerted when other PUIDs are used;
  that the call is the emergency communication when other alerting functions of the one or more called devices are adapted to function;
  an identity of the calling device and/or calling party to the user of the one or more called devices;
  a substantially simultaneous automatic alert to a predetermined subset of devices, each of which can be associated with one or more of the PUIDs based on the set of instructions chosen in activity 2300;
  a predetermined message to a predetermined subset of devices, each of which can be associated with one of the PUIDs based on the set of instructions chosen in activity 2300;
  a message entered by a user of the calling device, the message sent via a predetermined subset of the set of one or more SIP public user identities;
  a tone; and/or
  a message waiting indication; etc.

At activity 2700, a selection can be received from the calling party and/or the user. The selection can be indicative of whether an existing communication of the user is to be interrupted in order to communicatively couple the calling party to the user via a selected telecommunications device of the one or more devices. In certain exemplary embodiments, the selection can be received responsive to an option automatically provided to the user of the calling device to provide the alert to the user of the one or more called devices. The alert can be adapted to empower the user of the one or more called devices to interrupt a previously coupled call to receive the emergency communication. Activity 2700 can be optional and might or might not be included based on the set of instructions chosen in activity 2300.

At activity 2800, a communication can be interrupted responsive to the request for the call. In certain exemplary embodiments, based upon an automatically detected identity of the calling device, the previously coupled call can be automatically interrupted, which can be done pursuant to the set of instructions that were chosen in activity 2300. In certain exemplary embodiments, an Internet Protocol television transmission can be automatically interrupted to communicatively couple the call and/or a communication related to the call. In certain exemplary embodiments, an Internet gaming transmission can be automatically interrupted to communicatively couple the call and/or a communication related to the call. In certain exemplary embodiments, a non-call Internet transmission can be automatically interrupted to communicatively couple the call and/or a communication related to the call.

At activity 2900, the call can be communicatively coupled and/or connected. The call can be communicatively coupled between the calling party and the user via the selected telecommunications device of the one or more devices. The call can be connected via the emergency Session Initiation Protocol (SIP) public user identity provided by the calling device that requests the call. If a determination is made not to interrupt the existing communication, the call can be communicatively coupled between the calling party and a messaging system.

Figure 3:
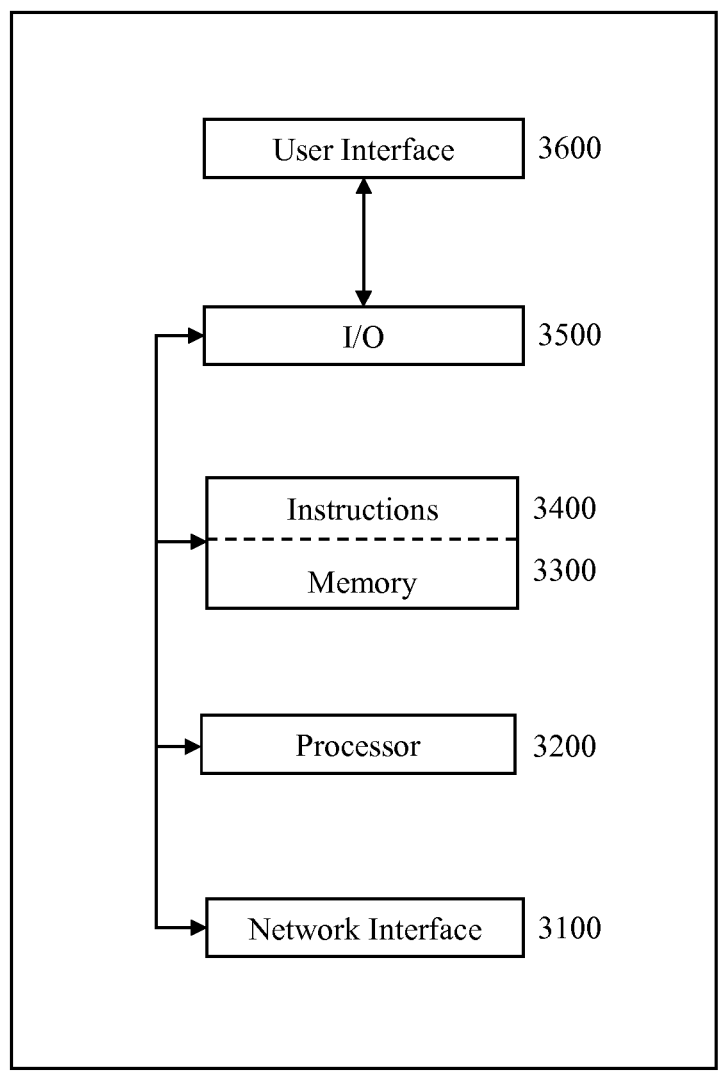
FIG. 3 is a block diagram of an exemplary embodiment of an information device 3000.

FIG. 3 is a block diagram of an exemplary embodiment of an information device 3000, which in certain operative embodiments can comprise, for example, server 1400 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc. Information device 3000 can be a single device or may be comprised of multiple devices connected by the network.

In certain exemplary embodiments, via one or more user interfaces 3600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority to this application, each definition (or redefined term if an original definition was amended during the prosecution of that patent), functions as a clear and unambiguous disavowal of the subject matter outside of that definition.

The term "a" means: at least one. The term "activity" means: an action, act, deed, function, step, and/or process and/or a portion thereof. The term "adapted to" means: suitable, fit, and/or capable of performing a specified function. The term "address" means: (n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, person, and/or network; (v.) to locate, access, assign, and/or provide an identifier a specific physical, logical, and/or virtual machine, process, node, object, entity, record, data element, component, port, interface, location, link, route, circuit, person, and/or network. The term "alert" means: an electrical, electronic, or mechanical device and/or display that serve to advise of a condition by way of a sound, signal, and/or haptic indication. The term "and/or" means: either in conjunction with or in alternative to. The term "apparatus" means: an appliance or device for a particular purpose. The term "approximately" means: about and/or nearly the same as.

The term "associated with" means: related to. The term "at least" means: not less than. The term "authorize" means: to grant authority, permission, or power to. The term "automatic" means: performed via an information device in a manner essentially independent of immediate influence and/or control by a user. The term "automatically" means: acting and/or operating in a manner essentially independent of external human influence and/or control. For example, an automatic light switch can turn on upon "seeing" a person in its view, without the person manually operating the light switch. The term "backbone network" means: a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network. The term "based upon" means: determined in consideration of and/or derived from. The term "between" means: in a separating interval and/or intermediate to.

The term "call" means: any form of communication (e.g., voice, video, text messaging, etc.) from a device capable of originating a communication to one or more devices capable of receiving the communication. The term "one or more called devices" means: an instrumentality adapted to receive a communication from another device. The term "calling device" means: an instrumentality adapted to initiate a communication to another device. Exemplary embodiments of such a device include, but are not limited to telephones, cell phones, Personal Digital Assistants, computers, laptops, and set top boxes. The term "can" means: is capable of, in at least some embodiments. The term "cause" means: to bring about, provoke, precipitate, produce, elicit, be the reason for, result in, and/or effect. The term "caused by" means: resulting from. The term "circuit" means: an electrically conductive pathway and/or a communications connection established across two or more switching devices comprised by a network and between corresponding end systems connected to, but not comprised by the network. The term "communicate" means: to exchange information. The term "communication" means: a transmission and/or exchange of information. The term "communicatively couple" means: to link in a manner that facilitates communications. The term "comprises" means: includes, but is not limited to, what follows. The term "comprising" means: including but not limited to, what follows. The term "configure" means: to make suitable or fit for a specific use or situation.

The term "connect" means: to physically and/or logically link. The term "couple" means: to join, connect, and/or link two things together. The term "data" means: distinct pieces of information, usually formatted in a special or predetermined way and/or organized to express concepts. The term "define" means: to establish the meaning, relationship, outline, form, and/or structure of, and/or to precisely and/or distinctly describe and/or specify. The term "definition" means: a specification. For example, a data log definition can specify record formatting and/or a number of records. The term "detect" means: to sense, perceive, identify, discover, ascertain, respond to, and/or receive the existence, presence, and/or fact of. The term "determine" means: to find out or come to a decision about by investigation, reasoning, or calculation. The term "device" means: a machine, manufacture, and/or collection thereof that operates individually and/or as a set to perform a function. The term "directly" means: without anything intervening. The term "dynamically" means: on demand or as necessary. The term "each" means: every one of a group considered individually. The term "either" means:

one or the other of two. The term "emergency" means: an unforeseen event and/or an event occurring at an unexpected time. The term "empower" means: to enable. The term "enter" means: to come and/or flow into.

The term "establish" means: to create, form, and/or set-up. The term "function" means: (n) a defined action, behavior, procedure, and/or mathematical relationship. (v) to perform as expected when applied. The term "further" means: in addition. The term "game" means: an activity performed according to a set of rules. The term "haptic" means: involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity. The term "information" means: facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

The term "information device" means: any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

The term "input/output (I/O) device" means: any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. The term "instructions" means: directions adapted to perform a particular operation or function. The term "interface" means: (n) an addressable device for communicatively coupling an entity (such as a router, server, switch, softswitch, gateway, etc.) to a packet network, the addressable device comprising hardware, firmware, and/or software, etc. The entity can have multiple interfaces, each of which can be addressable via one or more packet networks. (v) to connect with and/or interact with by way of an interface. The term "Internet" means: an interconnected global collection of networks that connect information devices. The term "Internet Protocol (IP)" means: a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time.

The term "Internet Protocol Multimedia Subsystem network" means: an architectural framework for delivering internet protocol (IP) multimedia to mobile users as specified by the 3rd Generation Partnership Project (3GPP) release 7 or later and/or Telecoms & Internet converged Services & Protocols for Advanced Networks (TISPAN) release R1.1 or later. The term "interrupt" means: to make a break in; to cease current flow through. The term "machine instructions" means: directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. The term "machine-readable medium" means: a physical structure from which a machine, such as an information device, computer, microprocessor, and/or controller, etc., can obtain and/or store data, information, and/or instructions. Examples include memories, punch cards, and/or optically-readable forms, etc.

The term "may" means: is allowed and/or permitted to, in at least some embodiments. The term "memory device" means: an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. The term "message" means: a communication. The term "message waiting indication" means: a sign or token indicative of a stored communication. The term "method" means: a process, procedure, and/or collection of related activities for accomplishing something.

The term "network" means: a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof. The term "network interface" means: any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

The term "non" means: not. The term "not" means: a negation of something. The term "notify" means: to advise and/or remind. The term "one" means: a single unit. The term "option" means: an alternative. The term "other" means: different from one mentioned or implied. The term "packet" means: a generic term for a bundle of data organized in a specific way for transmission, such as within and/or across a network, such as a digital packet-switching network, and comprising the data to be transmitted and certain control information, such as a destination address. The term "plurality" means: more than one. The term "predetermine" means: to determine, decide, and/or establish in advance. The term "previously" means: occurring before in time. The term "processor" means: a hardware, firmware, and/or software machine and/or virtual machine comprising a set of machine-readable instructions adaptable to perform a specific task.

A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller. The term "prompt" means: to advise and/or remind.

The term "provide" means: to furnish, supply, give, convey, send, and/or make available. The term "public user identity (PUID)" means: a Universal Resource Indicator (URI) associated with a user as defined by the 3rd Generation Partnership Project (3GPP) (a consortium that develops standards for mobile communications) document TS 23.228. The term "receive" means: to gather, take, acquire, obtain, accept, get, and/or have bestowed upon. The term "regarding" means: pertaining to. The term "related" means: connected to and/or associated with. The term "render" means: to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. The term "rendered" means: made perceptible to a human. For example data, commands, text, graphics, audio, video, animation, and/or hyperlinks, etc. can be rendered. Rendering can be via any visual and/or audio mechanism, such as via a display, a monitor, electric paper, an ocular implant, a speaker, and/or a cochlear implant, etc.

The term "repeatedly" means: again and again; repetitively. The term "request" means: (v.) to express a need and/or desire for; to inquire and/or ask for. (n.) that which communicates an expression of desire and/or that which is asked for. The term "require" means: to compel, demand, need, and/or request. The term "said" means: when used in a system or device claim, an article indicating a subsequent claim term that has been previously introduced. The term "sent" means: transmitted. The term "server" means: an information device and/or a process running thereon that is adapted to be communicatively coupled to a network and that is adapted to provide at least one service for at least one other information device communicatively coupled to the network and/or for at least one process running on the other information device. A common example is a file server, which has a local disk and services requests from remote clients to read and write files on that disk. A server can also provide access to resources, such as programs, shared devices, etc. The term "Session Initiation Protocol (SIP)" means: an application-layer control (signaling) protocol for creating, modifying, and terminating sessions with one or more participants as specified in Request For Comment document 3261 from the Internet Engineering Task Force (IETF). The term "set" means: a related plurality. The term "signal" means: information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

The term "simultaneously" means: at substantially the same time. The term "store" means: to place, hold, retain, enter, and/or copy into and/or onto a machine-readable medium. The term "subset" means: a portion of a set. The term "substantially" means: to a considerable, large, and/or great, but not necessarily whole and/or entire, extent and/or degree. The term "system" means: a collection of mechanisms, devices, data, and/or instructions, the collection designed to perform one or more specific functions. The term "television transmission" means: a steam of broadcast images having an appearance of motion. The term "threshold" means: a point that when exceeded produces a given effect or result. The term "tone" means: a sound of distinct pitch, quality, and duration. The term "transmit" means: to provide, furnish, supply, send as a signal, and/or to convey (e.g., force, energy, and/or information) from one place and/or thing to another. The term "turned off" means: caused to be non-functional. The term "uniquely" means: being the only one of a kind.

The term "user interface" means: a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc. The term "utilize" means: to use and/or put into service. The term "via" means: by way of and/or utilizing. The term "when" means: at a time. The term "wherein" means: in regard to which; and; and/or in addition to.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a U.S. patent, U.S. patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method comprising:
    defining an emergency session initiation protocol public user identity at a server in an internet protocol multimedia subsystem network, wherein the emergency session initiation protocol public user identity is uniquely associated with a user of a called device, wherein the emergency session initiation protocol public user identity is generated by converting a phone number associated with a call, wherein the server associates the emergency session initiation protocol public user identity with the called device, and wherein the emergency session initiation protocol public user identity is one of a set of session initiation protocol public user identities associated with the user;
    receiving a request for the call from a calling device, wherein the request comprises the emergency session initiation protocol public user identity;
    determining if an identifier of the calling device is in a white list for utilizing the emergency session initiation protocol public user identity;
    causing an alert to be rendered via the called device if the identifier of the calling device is in the white list, wherein the alert indicates that the call is an emergency communication, wherein the alert enables a previously coupled call to be interrupted in order to receive the call from the calling device;

modifying, if the identifier of the calling device is not in the white list, the emergency session initiation protocol public user identity to create a new emergency session initiation protocol public user identity, wherein the new emergency session initiation protocol public user identity has a lower priority than the emergency session initiation protocol public user identity; and causing the call to be connected.

2. A method comprising:

causing a call to be connected,
- wherein the call is connected via an emergency session initiation protocol public user identity provided by a calling device that requests the call,
- wherein the emergency session initiation protocol public user identity is generated by converting a phone number associated with the call,
- wherein the emergency session initiation protocol public user identity is associated with a called device of the call by a network server,
- wherein the emergency session initiation protocol public user identity is one of a set of session initiation protocol public user identities associated with a user of the called device, and
- wherein the emergency session initiation protocol public user identity is defined in an internet protocol multimedia subsystem network,
- alerting, if an identifier of the calling device is in a white list for utilizing the emergency session initiation protocol public user identity, the called device that the call is an emergency communication via an alert rendered via a request of the calling device, wherein the alert enables a previously coupled call to be interrupted so that the call is received at the called device; and
- modifying, if the identifier of the calling device is not in the white list, the emergency session initiation protocol public user identity to create a new emergency session initiation protocol public user identity, wherein the new emergency session initiation protocol public user identity has a lower priority than the emergency session initiation protocol public user identity.

3. The method of claim 2, further comprising:
alerting the called device that the call is the emergency communication when machine instructions provide that non-emergency alerts will not be rendered.

4. The method of claim 2, further comprising:
alerting the called device that the call is the emergency communication when other alerting functions of the called device are configured to function.

5. The method of claim 2, further comprising:
rendering an identity of the calling device to the called device when machine instructions provide that non-emergency alerts will not be rendered.

6. The method of claim 2, further comprising:
interrupting the previously coupled call based upon a detected identity of the calling device.

7. The method of claim 2, further comprising:
providing an option to provide the alert to the called device.

8. The method of claim 2, further comprising:
interrupting an internet protocol television transmission to communicatively couple the call.

9. The method of claim 2, further comprising:
interrupting an internet gaming transmission to communicatively couple the call.

10. The method of claim 2, further comprising:
interrupting a non-call internet transmission to communicatively couple the call.

11. The method of claim 2, further comprising:
simultaneously providing an automatic alert via a predetermined subset of the set of session initiation protocol public user identities.

12. The method of claim 2, further comprising:
providing a predetermined message via a predetermined subset of the set of session initiation protocol public user identities.

13. The method of claim 2, further comprising:
providing a message entered by the calling device, wherein the message is sent via a predetermined subset of the set of session initiation protocol public user identities.

14. The method of claim 2, further comprising:
determining that the calling device is authorized to utilize the emergency session initiation protocol public user identity.

15. The method of claim 2, further comprising:
determining that the calling device is not authorized to utilize the emergency session initiation protocol public user identity.

16. The method of claim 2, wherein alerting the called device comprises alerting the called device via a tone.

17. The method of claim 2, wherein alerting the called device comprises alerting the called device via one of a visual and audible message waiting indication.

18. A method comprising:

causing a call to be connected,
- wherein the call is connected via a changed emergency session initiation protocol public user identity provided by a server,
- wherein the server changes, in response to a determination that predetermined instructions regarding an original emergency session initiation protocol public user identity are applicable, the original emergency session initiation protocol public user identity provided by a calling device that requests the call to the changed emergency session initiation protocol public user identity, wherein the original emergency session initiation protocol public user identity is generated by converting a phone number associated with the call,
- wherein the original emergency session initiation protocol public user identity is associated by the network with a called device of the call,
- wherein the original emergency session initiation protocol public user identity is one of a set of session initiation protocol public user identities associated with a user of the called device, and
- wherein the original emergency session initiation protocol public user identity is defined in an internet protocol multimedia subsystem network,
- alerting, if an identifier of the calling device is in a white list for utilizing the emergency session initiation protocol public user identity, the called device that the call is an emergency communication via an alert rendered via a request of the calling device, wherein the alert enables a previously coupled call to be interrupted so that the call is received by the called device; and
- modifying, if the identifier of the calling device is not in the white list, the changed emergency session initiation protocol public user identity to create a new emergency session initiation protocol public user identity, wherein the new emergency session initiation protocol public user identity has a lower priority than the changed emergency session initiation protocol public user identity.

19. A tangible machine-readable medium comprising machine instructions, which when executed by a processor, cause the processor to perform operations comprising:

rendering an alert to a called device, wherein the alert is caused by a transmitted message that comprises an emergency session initiation protocol public user identity provided by a calling device, wherein the emergency session initiation protocol public user identity is uniquely associated with the called device, wherein the emergency session initiation protocol public user identity is one of a set of session initiation protocol public user identities associated with a user of the called device, wherein the emergency session initiation protocol public user identity is defined in an internet protocol multimedia network, wherein the emergency session initiation protocol public user identity is generated by converting a phone number associated with a call to the called device;

notifying, if an identifier of the calling device is in a white list for utilizing the emergency session initiation protocol public user identity, the called device regarding an emergency communication via the alert, wherein the alert enables a previously coupled call to be interrupted so that the emergency communication is received by the called device; and modifying, if the identifier of the calling device is not in the white list the emergency session initiation protocol public user identity to create a new emergency session initiation protocol public user identity wherein the new emergency session initiation protocol public user identity has a lower priority than the emergency session initiation protocol public user identity.

20. A method comprising:

interrupting a previously communicatively coupled call with an emergency communication, wherein the emergency communication comprises an emergency session initiation protocol public user identity provided by a calling device, wherein the emergency session initiation protocol public user identity is uniquely associated with a called device, wherein the emergency public user identity is one of a set of session initiation protocol public user identities associated with a user of the called device, wherein the emergency session initiation protocol public user identity is defined in an internet protocol multimedia subsystem network, wherein the emergency session initiation protocol public user identity is generated by converting a phone number associated with a call to the called device;

causing, if an identifier of the calling device is in a white list for utilizing the emergency session initiation protocol public user identity, an alert to be rendered via the called device by using a request of the calling device comprising the emergency session initiation protocol public user identity, wherein the alert prompts the called device of the emergency communication; and modifying, if the identifier of the calling device is not in the white list, the emergency session initiation protocol public user identity to create a new emergency session initiation protocol public user identity, wherein the new emergency session initiation protocol public user identity has a lower priority than the emergency session initiation protocol public user identity.

21. A system comprising:

a processor that executes instructions from a memory to receive a transmitted request that comprises an emergency session initiation protocol public user identity, wherein the emergency session initiation protocol public user identity is generated by converting a phone number associated with a call to a called device, wherein the processor modifies the emergency session initiation protocol public user identity to create a new emergency session initiation protocol public user identity if an identifier of a calling device is not in a white list for utilizing the emergency session initiation protocol public user identity, wherein the new emergency session initiation protocol public user identity has a lower priority than the emergency session initiation protocol public user identity;

wherein the processor causes a prompt to be provided to the called device if the identifier of the calling device is in the white list for utilizing the emergency session initiation protocol public user identity, wherein the prompt enables a previously coupled call to be interrupted so that an emergency communication is received by the called device, and wherein the emergency session initiation protocol public user identity is uniquely associated with the called device, wherein the emergency session initiation protocol public user identity is one of a set of session initiation protocol public user identities associated with the user of the called device, wherein the emergency session initiation protocol public user identity is defined in an internet protocol multimedia subsystem network.

* * * * *